United States Patent
Young et al.

(10) Patent No.: US 8,378,848 B2
(45) Date of Patent: Feb. 19, 2013

(54) VIRTUAL SMART ENERGY METER WITH INTEGRATED PLUG

(75) Inventors: Joel K. Young, Eden Prairie, MN (US); David Mayne, Eagan, MN (US)

(73) Assignee: Digi International Inc., Minnetonka, MN (US)

( * ) Notice: Subject to any disclaimer, the term of this patent is extended or adjusted under 35 U.S.C. 154(b) by 300 days.

(21) Appl. No.: 12/823,309

(22) Filed: Jun. 25, 2010

(65) Prior Publication Data

US 2011/0316717 A1    Dec. 29, 2011

(51) Int. Cl.
G08C 19/22    (2006.01)
(52) U.S. Cl. ............................. 340/870.07; 340/870.02
(58) Field of Classification Search ............. 340/870.07, 340/870.02
See application file for complete search history.

(56) References Cited

U.S. PATENT DOCUMENTS

| | | | |
|---|---|---|---|
| 4,462,113 A | 7/1984 | Iwata | |
| 5,237,663 A | 8/1993 | Srinivasan | |
| 5,838,226 A | 11/1998 | Houggy et al. | |
| 5,954,817 A | 9/1999 | Janssen et al. | |
| 6,131,040 A | 10/2000 | Knuutila et al. | |
| 6,175,860 B1 | 1/2001 | Gaucher | |
| 6,509,913 B2 | 1/2003 | Martin, Jr. et al. | |
| 6,728,531 B1 | 4/2004 | Lee et al. | |
| 6,748,278 B1 | 6/2004 | Maymudes | |
| 7,463,877 B2 | 12/2008 | Iwamura | |
| 7,486,648 B1 | 2/2009 | Baranowski | |
| 7,853,221 B2 | 12/2010 | Rodriguez et al. | |
| 8,041,369 B2 | 10/2011 | Smith et al. | |
| 2002/0068558 A1 | 6/2002 | Janik | |
| 2003/0078072 A1 | 4/2003 | Serceki et al. | |
| 2003/0198208 A1 | 10/2003 | Koos, Jr. et al. | |
| 2004/0174900 A1 | 9/2004 | Volpi | |
| 2004/0212500 A1 | 10/2004 | Stilp | |
| 2004/0235468 A1 | 11/2004 | Luebke et al. | |
| 2004/0253945 A1 | 12/2004 | Janik | |
| 2005/0044372 A1 | 2/2005 | Aull et al. | |
| 2005/0136972 A1 | 6/2005 | Smith et al. | |
| 2005/0271128 A1 | 12/2005 | Williams et al. | |
| 2006/0104291 A1 | 5/2006 | Rodriguez et al. | |
| 2006/0187023 A1 | 8/2006 | Iwamura | |
| 2007/0197262 A1 | 8/2007 | Smith et al. | |
| 2007/0293208 A1 | 12/2007 | Loh et al. | |

(Continued)

FOREIGN PATENT DOCUMENTS

DE    202005004352 U1    7/2005
DE    102006030797 A1    1/2008

(Continued)

OTHER PUBLICATIONS

"U.S. Appl. No. 11/773,266, Non-Final Office Action mailed Sep. 20, 2010", 17 pgs.

(Continued)

Primary Examiner — Joseph Chang
(74) Attorney, Agent, or Firm — Fogg & Powers LLC

(57) ABSTRACT

Various embodiments include a virtual meter. The virtual meter includes a controller configured to communicate, with a utility meter, meter information, using a first communications protocol. The controller may also be configured to translate between the meter information and virtual meter information. The controller may further be configured to communicate, with a smart energy network, the virtual meter information using a second communications protocol. Other devices and methods are disclosed.

35 Claims, 6 Drawing Sheets

U.S. PATENT DOCUMENTS

| | | | |
|---|---|---|---|
| 2008/0057931 | A1 | 3/2008 | Nass et al. |
| 2008/0224892 | A1 | 9/2008 | Bogolea et al. |
| 2008/0278327 | A1 | 11/2008 | Nierenberg et al. |
| 2009/0010178 | A1 | 1/2009 | Tekippe |
| 2009/0088907 | A1 | 4/2009 | Lewis et al. |
| 2009/0140861 | A1 | 6/2009 | Caliri et al. |
| 2009/0174569 | A1 | 7/2009 | Smith et al. |
| 2009/0243869 | A1 | 10/2009 | Sanderford, Jr. |
| 2009/0298490 | A9 | 12/2009 | Janik |
| 2010/0130142 | A1 | 5/2010 | Schubert |
| 2010/0156665 | A1 | 6/2010 | Krzyzanowski et al. |
| 2010/0232400 | A1 | 9/2010 | Patil et al. |
| 2011/0084809 | A1 | 4/2011 | Perkins |
| 2011/0248857 | A1* | 10/2011 | Rutherford et al. ........... 340/632 |
| 2011/0287757 | A1 | 11/2011 | Nykoluk et al. |
| 2011/0298301 | A1 | 12/2011 | Wong et al. |
| 2012/0083228 | A1 | 4/2012 | Baumert et al. |

FOREIGN PATENT DOCUMENTS

| | | | |
|---|---|---|---|
| EP | 2134112 A1 | 12/2009 | |
| WO | WO-03/047122 A1 | 6/2003 | |
| WO | WO-2008001146 A1 | 1/2008 | |
| WO | WO-2008092268 A1 | 8/2008 | |
| WO | WO-2009/005807 A1 | 1/2009 | |
| WO | WO-2011163569 A2 | 12/2011 | |
| WO | WO-2011163569 A3 | 12/2011 | |

OTHER PUBLICATIONS

"U.S. Appl. No. 11/773,266, Response filed Dec. 20, 2010 to Non Final Office Action mailed Sep. 20, 2010", 12 pgs.

"European Application Serial No. 08779932.6, Office Action mailed Feb. 10, 2011", 6 pgs.

"European Application Serial No. 08779932.6, Office Action Response Filed Sep. 14, 2010", 4 pgs.

"International Application No. PCT/US2008/008207, International Preliminary Report on Patentability", (Jan. 14, 2010), 10 pgs.

"International Application Serial No. PCT/US2008/008207, International Search Report Mailed on Nov. 25, 2008".

"International Application Serial No. PCT/US2008/008207, International Written Opinion Mailed on Nov. 25, 2008".

"LZR01D01 ZigBee Router—Logitech (Taiwan)", http://www.logi.com.tw/index_files/Page695.htm, (Unknown; prior to May 7, 2007), 1 page.

"Referenzhandbuch fur den RangeMax Wireless Router WPN824", NETGEAR, Inc., Santa Clara, CA 95054 USA, ftp://ftp.netgear.de/download/WPN824/WPN824-FullManualdeutsch.pdf, (May 2005), i to x and 1-1 to 2-9.

Gutierrez, J. A, et al., "IEEE 802.15.4:Developing Standard for Low-Power Low-cost Wireless Personal area Networks", IEEE Network, IEEE Service Center, (Sep. 1, 2001), pp. 12-19.

Jin-Shyan L, et al., "ITRI Zbnode : A Zig Bee /IEEE 802.15.4 Platform for Wireless Networks", System, Man and Cybernetics, (Oct. 1, 2006), pp. 1462-1467.

Lee, Jin-Shyan, et al., "ITRI ZBnode: A ZigBee/IEEE 802.15.4 Platform for Wireless Sensor Networks", IEEE International Conference on Systems, Man and Cybernetics, 2006. SMC '06, vol. 2, (2006), 1462-1467.

NETGEAR, Inc, "Refrenzhandbuch fur den Range Max Wireless Router WPN824", (May 2005), pp. 1-9.

"U.S. Appl. No. 11/773,266, Final Office Action mailed Mar. 23, 2011", 19 pgs.

"U.S. Appl. No. 11/773,266, Non Final Office Action mailed Sep. 20, 2010", 17 pgs.

"U.S. Appl. No. 12/895,903, Non Final Office Action mailed Aug. 24, 2012", 14 pgs.

"U.S. Appl. No. 12/895,903, Restriction Requirement mailed May 8, 2012", 5 pgs.

"European Application Serial No. 08779932.6, Office Action mailed Jun. 1, 2010", 7 pgs.

"European Application Serial No. 08779932.6, Response filed Sep. 14, 2010 to Office Action mailed Jun. 1, 2010", 4 pgs.

"European Application Serial No. 11183626.8, Office Action mailed Feb. 1, 2012", 10 pgs.

"International Application Serial No. PCT/US2008/008207, International Preliminary Report on Patentability mailed Jan. 14, 2010", 10 pgs.

"International Application Serial No. PCT/US2008/008207, International Search Report mailed Nov. 25, 2008", 12 pgs.

"International Application Serial No. PCT/US2008/008207, Written Opinion mailed Nov. 25, 2008", 11 pgs.

"International Application Serial No. PCT/US2011/041782, International Search Report mailed Dec. 28, 2011", 4 pgs.

"International Application Serial No. PCT/US2011/041782, Written Opinion mailed Dec. 28, 2011", 7 pgs.

* cited by examiner

US 8,378,848 B2

VIRTUAL SMART ENERGY METER WITH INTEGRATED PLUG

TECHNICAL FIELD

This document pertains generally to utility monitoring devices that communicate via a network, and more particularly, but not by way of limitation, to a virtual smart energy meter with integrated plug.

BACKGROUND

Utility companies generally must read their meters in order to bill customers for the resources consumed by the customers. In the past, a meter-reader—a person—may have needed to visit each home and business and read the meter. More recently, some utility meter manufacturers have equipped utility meters with automatic meter reader systems ("AMR"). The AMR typically designates the utility meter data format as well as the communications protocol used in transmitting the data. An example legacy AMR system may be Itron Encoder-Receiver-Transmitter ("ERT"). Frequently, the legacy AMR system wirelessly transmits the meter reading, but the range of the transmission is limited. The limited range often requires an electronic meter-reader—a device—to be close to the meter to get a reading, although generally the operator may not have to walk right up to the meter. This means that the meter-reader may have to drive or walk by every meter to collect the data. In some instances, however, the meter-reader will still need to approach the meter even though the reading is accomplished electronically. Collecting the meter data in this way is time consuming and often only permits infrequent meter readings, such as once a month.

The AMR of utility meters is generally designated by the utility meter manufacturer. Often, the AMR of a given utility meter is not compatible with a smart energy ("SE") network deployed at the site of the utility meter. Retrofitting existing meters to communicate with the SE network may be expensive and require tremendous effort while replacing otherwise satisfactory utility meters to being even more expensive if they cannot be retrofitted.

SE devices and networks have been deployed in homes and businesses as utilities and consumers attempt to better understand and control energy use. SE networks are typically a collection of monitoring, control, and reporting devices located, for example, in a home or a business. Typical SE devices may include, for example, thermostats and water, gas, and electric utility meters. The SE devices generally implement one or more communications protocols to communicate with each other and ultimately the utility or consumer. SE devices also typically conform to a standard reporting format based on the device. For example, all SE gas meters in a given SE network may produce data in a common format. Some SE networks may interface with an automated metering infrastructure ("AMI") network of a utility company to record data from SE meters. ZigBee Alliance Smart Energy is an example SE network and set of SE device standards.

The SE devices on the SE network may be interconnected in various ways but are often interconnected, at least in part, by a mesh network. The mesh network may be a wireless personal area network ("WPAN"). An example of a WPAN is a ZigBee wireless network. A ZigBee wireless network implements the IEEE 802.15.4 communication protocol standard for WPANs. WPAN node devices are typically low power [e.g., 1 milliwatt (mW) to 250 mW] and have lower data rates [e.g., 250 kilobits per second (kbps)] than node devices for other networks.

WPAN node devices are typically powered by either an external power brick requiring a power cord or they are powered by batteries. WPAN node devices having an external power brick are bulky and may make a WPAN less convenient to implement. Such WPAN node devices often require additional mounting hardware or a special installation which can be expensive and cumbersome.

A WPAN implemented using battery powered node devices tries to conserve power and extend the life of the batteries of the individual nodes. To extend the battery life of battery-powered router nodes in WPAN applications, the nodes may be required to enter a very low power mode for most of the time that the network is operating, which results in decreased throughput. Periods of high network traffic can quickly drain batteries. Furthermore, when batteries reach the end of their life, battery powered nodes require more maintenance and pose a higher risk of network failure.

OVERVIEW

In a system with a smart energy ("SE") network and a utility meter, it may be advantageous to also have a virtual meter. The virtual meter may communicate with the utility meter in a first format using a first communications protocol. The virtual meter may translate a message in the first format to a message in a second format. The virtual meter may communicate with the SE network in the second format using a second communications protocol. In this way the virtual meter may allow the utility meter to be used as a SE meter without expensive upgrades, possibly allowing for more frequent and accurate utility meter readings. This document provides numerous examples in the detailed description, an overview of which is provided here.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Cost effective integration of utility meters into SE networks may be accomplished by translating the AMR communications of the utility meter to the SE standard in effect for the SE network. A virtual meter may be used to interface with both the disparate communications protocols between the utility meter and the SE network, as well as the disparate information formats that may also exist.

Making the virtual meter part of an effective SE network may involve placing the virtual meter in locations conducive to communicating with other SE network nodes. In a wireless SE network, this may involve placing the virtual meter closely enough to other nodes such that the RF signals are received with sufficient integrity. In wireless networks, the power of a given node's transmitter may impact the distance its transmissions may be effectively received. Other factors, however, such as building materials at the SE network site, may also impact the desired positioning of a node.

An additional consideration impacts the positioning of the virtual meter, namely, access to the utility meter. For example, the virtual meter may be placed closely to the utility meter if the utility meter's communication range is limited. Because the placement of the virtual meter may depend on several factors, convenience in installing the virtual meter helps to mitigate some of the difficulty in deploying it as part of an SE network. Integrating a plug into the virtual meter may provide for easy installation at any electrical outlet without additional hardware or labor, as well as provide ample power to increase its transmission integrity.

Figure 1:
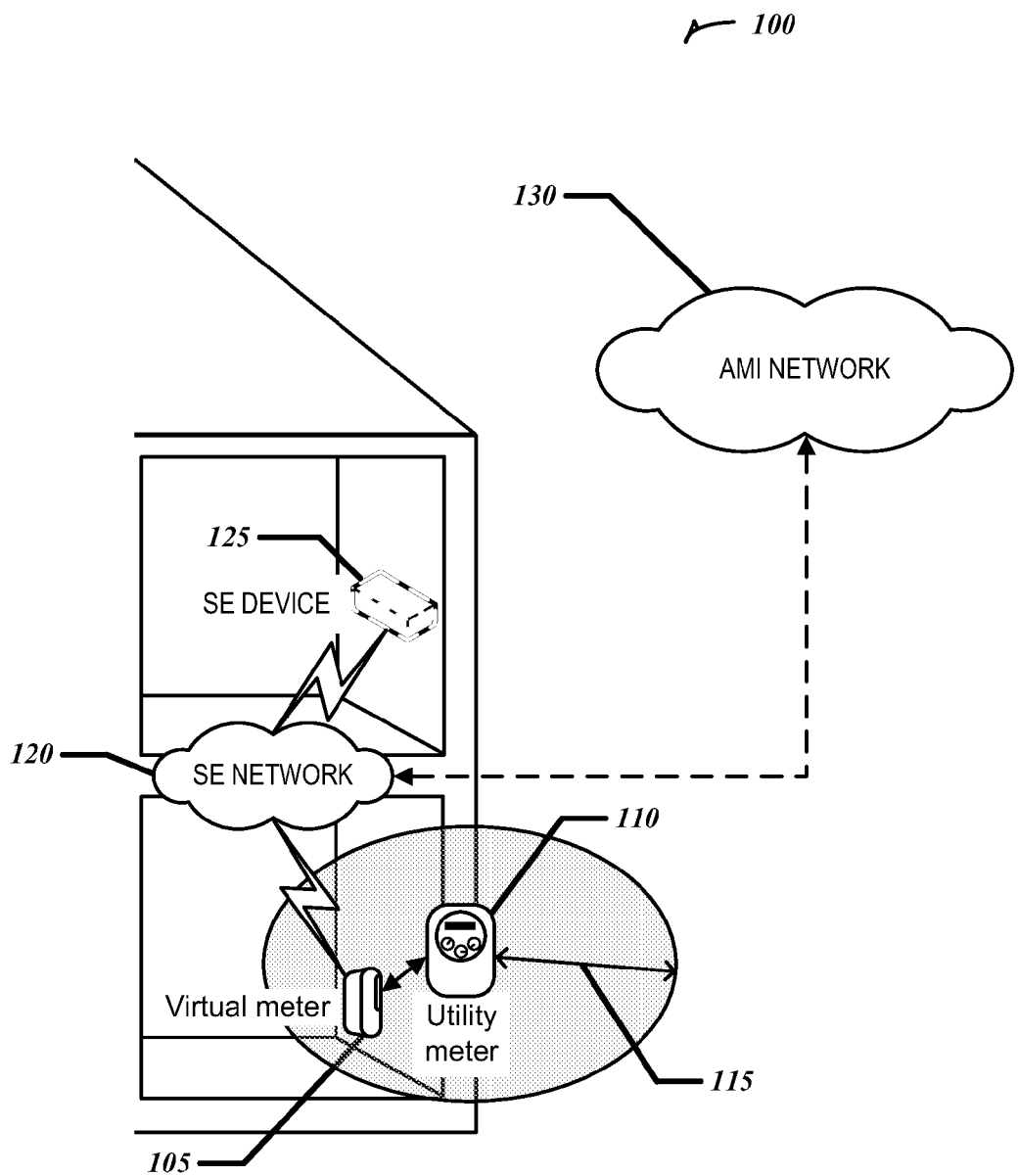
FIG. 1 illustrates an example system using a virtual meter.

FIG. 1 illustrates an example system 100 using a virtual meter. System 100 may include a virtual meter 105, a utility meter 110, and a SE network 120. In some embodiments an automated meter infrastructure ("AMI") 130 network may be communicatively coupled to the SE network 120.

The utility meter 110 may be equipped with a legacy AMR system with a range 115, represented by the shaded oval in FIG. 1. In some embodiments the utility meter 110 may have a wired electronic interface. The utility meter 115 may communicate with an outside device, such as the virtual meter 105, in a communications protocol dictated by the manufacturer installed AMR. The format of the data communication by the utility meter 110 may also be dictated by the AMR. The AMR data format may be field based, or it may be positional. For example, in a positional format, a specific number of bits (or bytes), offset from the first bit, may encode the unit's identification code. In a field based format, the same identification code may be in a message data field associated with that value.

In some embodiments the SE network 120 may include, in addition to the virtual meter 105, one or more SE devices 125. Example SE devices 125 may be thermostats, light sensors, or SE utility meters. In some embodiments the SE network 120 may include additional devices, such as SE routers and SE gateways, which may facilitate the operation of the SE network 120. In some embodiments the SE network 120 is a mesh network; a more detailed description of a mesh based SE network is given below with regard to FIGS. 2a-b. In some embodiments the SE network 120 interfaces with the AMI 130 to provide monitoring and control functions to one or more utility companies, or other interested parties. In some embodiments the communications protocol conforms to a standard, such as a ZigBee wireless network, or ZigBee Alliance's Smart Energy standard. In some embodiments the SE devices 125, and other devices on the SE network 120, conform to a standard, sometimes a standard specific to that device. For example, a SE gas meter may report the amount of gas consumed in a given time period according to the SE gas meter standard. An example standard is the ZigBee Alliance's Smart Energy standard, including the Smart Energy 1.1 standard.

The virtual meter 105 may implement both the communications protocol of the SE network 120 and the communications protocol of the utility meter 110. For example, the virtual meter 105 may include the necessary hardware and software to connect to and join the SE network 120 as well as the hardware and software necessary to function as an AMR reader, or other electronic meter-read, for the utility meter 110. As a functional AMR reader, the virtual meter 105 may also include the software or hardware necessary to encode data sent to the utility meter 110 and decode the data received from the utility meter 110. The virtual meter 105 may be placed within the range 115 of the utility meter 110 to interface with it. The virtual meter 105 may also contain the necessary software to conform to the SE device standard for the utility meter 110 in order to present it as an SE utility meter. For example, if the utility meter 110 is a gas meter, then the virtual meter 105 may conform to the SE gas meter standard when communicating with the SE network 120. By interfacing with the utility meter 110, the virtual meter 105 may integrate the utility meter 110 into the SE network 120 without expensive upgrades. Additionally, if the SE network 120 is connected to an AMI 130, the utility company may not have to replace a utility meter 110 in good condition simply to take advantage of the benefits AMI 130 offers. This may allow for reading the utility meter more frequently which may result in greater data accuracy to improve, for example, conservation efforts or other programs.

In some embodiments the virtual meter 105 may contain an integrated plug to mount it to an electrical outlet. The virtual meter 105 may not have an external power brick. Consequently, the virtual meter 150 may have a very compact form factor. Having a single enclosure may improve reliability of the virtual meter 105 because it does not have an external power brick which can be accidentally removed and it does not have dangling power cords which may become caught or tangled. In some embodiments the power plug may be interchangeable, allowing it to be interchanged with power plugs of different standards, such as U.S. standard plug, U.K. standard, E.U. standard, Japan standard, and Australia standard plugs for example. The virtual meter 150 may also include a universal power supply circuit able to operate at a variety of electrical outlet voltages. This may allow a single type of universal meter 105 to be distributed internationally for deployment in SE networks 120 in a variety of countries. Integrating the power plug into the virtual meter 105 may ease deployment of the virtual meter 105 by allowing for easy placement and ample power to interface with both the SE network 120 and the utility meter 110.

In some embodiments the virtual meter 105 may include an SE device 125, SE gateway, SE router, or other component of the SE network 120. In some embodiments, the included, or integrated, SE gateway may be an Energy Services Interface ("ESI") or an Energy Services Portal ("ESP") to connect the SE network 120 to the AMI network 130. In other embodiments the virtual meter 105 may interface with additional utility meters using the same AMR as the utility meter 110. By combining functionality into a single package, the virtual meter 105 may further reduce costs to a utility company or others.

Figure 2A:
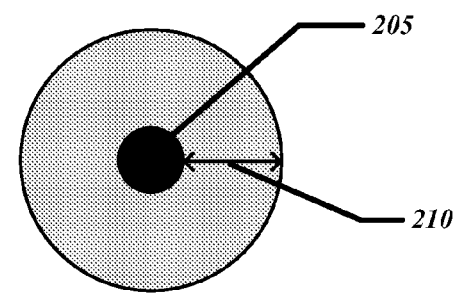
FIG. 2a illustrates an example node in a wireless mesh network.

FIG. 2a illustrates an example node 205 in a wireless mesh network. The smaller circle is the node 205 and the larger circle represents the wireless range 210 of the node 205. A node 205 may transmit data to other nodes within its range 210.

Figure 2B:
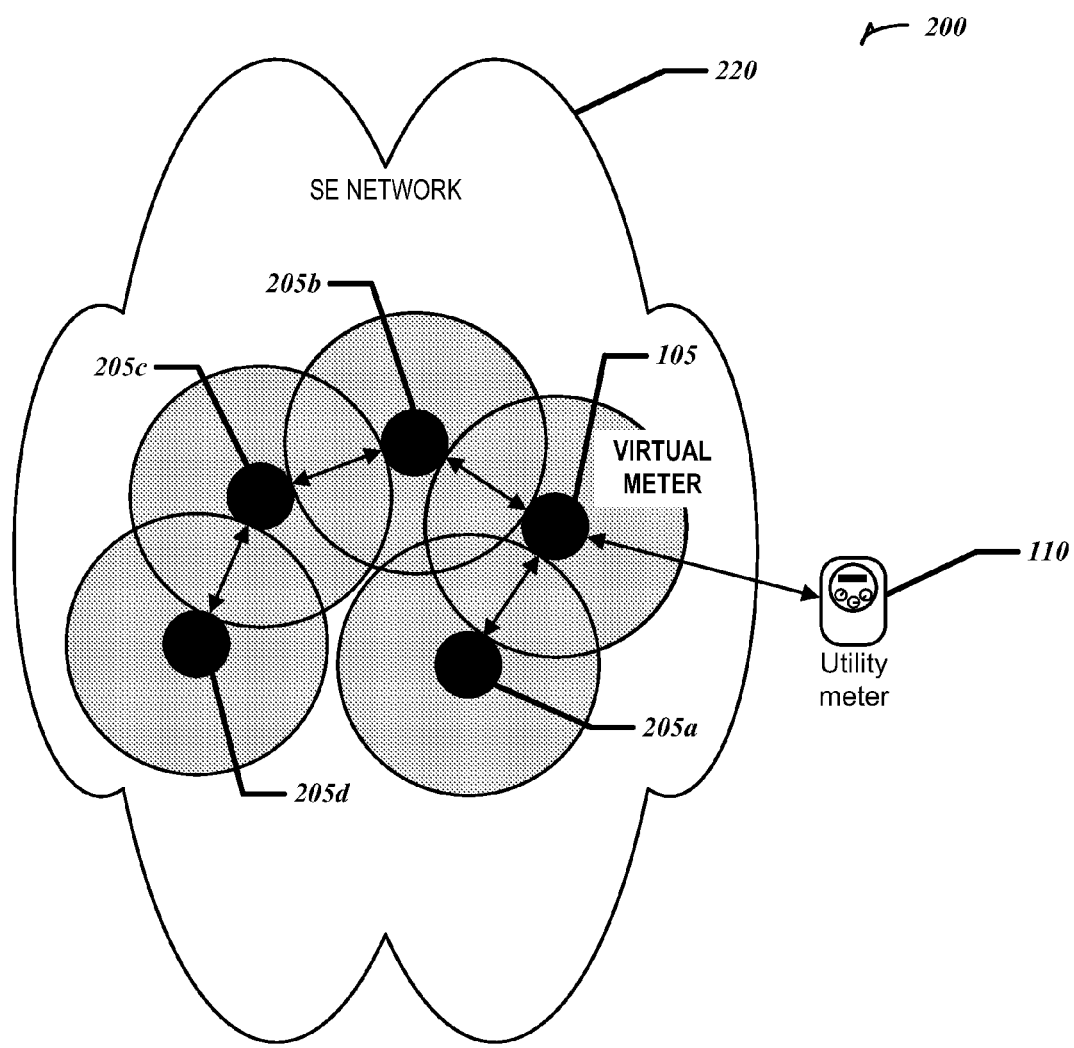
FIG. 2b illustrates an example SE network containing wireless mesh network nodes communicating with a utility meter.

FIG. 2b illustrates an example system 200 which may include a utility meter 110 and a SE network 120 containing wireless mesh network nodes 205a-d including a virtual meter 105.

In some embodiments the SE network 120 may be a mesh network formed by nodes 205a-c and the virtual meter 105. In some embodiments the SE network 120 may be an ad hoc mesh network, which is self-configuring and may exhibit a dynamic network topology. The mesh SE network 120 may be a WPAN. Examples of a WPAN include, without limitation, a ZigBee protocol network or any network using the IEEE 802.15.4 communication protocol standard for WPANs. Implementation of other mesh network protocols is also contemplated. The following is an example of mesh network communication: if node 205c communicates with node 205a, the communication may be routed through node 205b and the virtual meter 105 to arrive at node 205a. The virtual meter 105 may be placed such that its range 210 covers another node 205 and another node's 205 range 210 covers the virtual meter 105, thus connecting the virtual meter 105 to the SE network 120. In some embodiments, deploying the virtual meter 105 in the SE network 120 may be assisted through physical or logical status indications initiated by the virtual meter 105. These indications may be, for example, visual cues, such as an affixed lighting element of the virtual meter 105, which blinks while joining the SE network 120 and becomes solid once a connection has been made. The indications may also be logical, communicated to a device on the SE network 120 or connected wired or wirelessly directly to the virtual meter 105. In some embodiments the nodes 205a-d may include mesh network routers, SE devices, or other components of the SE network 120.

In some embodiments the virtual meter 105 may accept communications for the utility meter 110, including to the SE utility meter represented by the virtual meter 105, from one or more of the nodes 205. The virtual meter 105 may then translate the communications to a format understood by the utility meter 110 and transmit the translated communications to the utility meter 105. The virtual meter 105 may then receive a response, or simply a communication, from the utility meter 110, translate it back to the SE meter format, and then communicate it to the SE network 120. Thus, to the SE network 120, and the included or interfacing devices, the virtual meter 105 represents the utility meter 110 as an SE utility meter.

Figure 3:
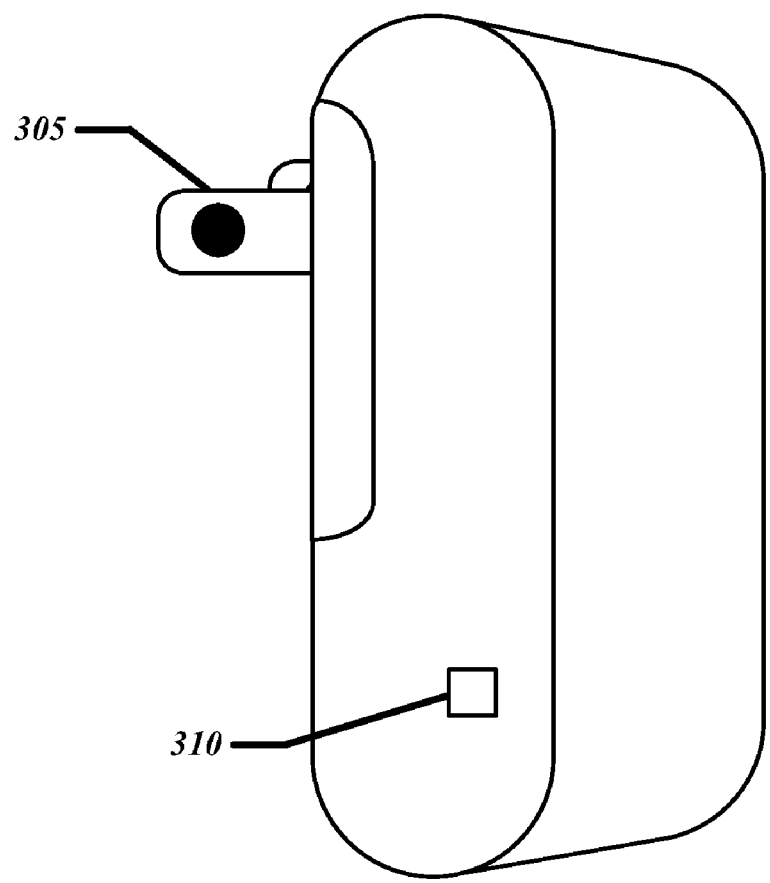
FIG. 3 illustrates an example virtual meter.

FIG. 3 illustrates an example virtual meter 105 including an integrated power plug 105 to mount the virtual meter 105 to an electrical outlet. In some embodiments the electrical outlet is a standard wall outlet. In other embodiments the electrical outlet may be different than a standard wall outlet. The virtual meter 105 may include an external antenna connector 110. In some embodiments the virtual meter 105 may also include external indicators, such as one or more light emitting diodes, or external ports for wired connection to configuration devices or wired interfaces to the utility meter 110, among other devices. Example external ports may include serial ports, USB ports, and Ethernet ports.

Figure 4A:
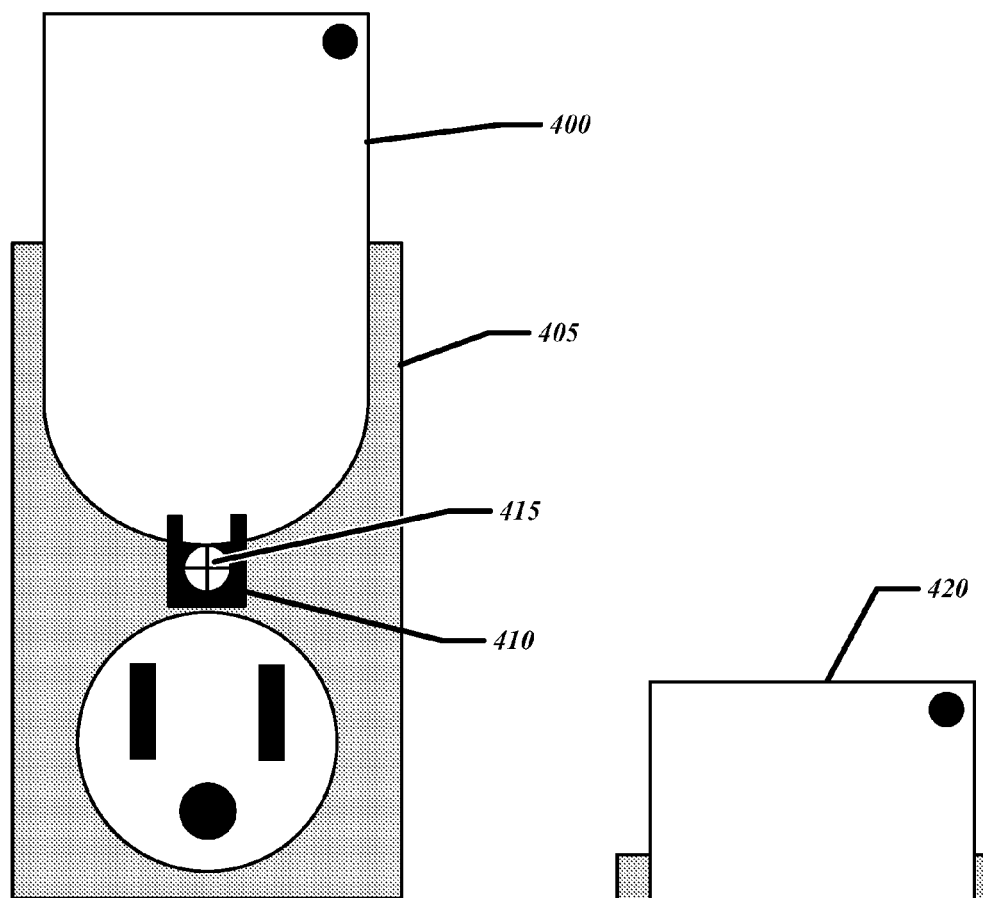
FIGS. 4a-b illustrate components involved in securing an example virtual meter to an electrical outlet.
Figure 4B:
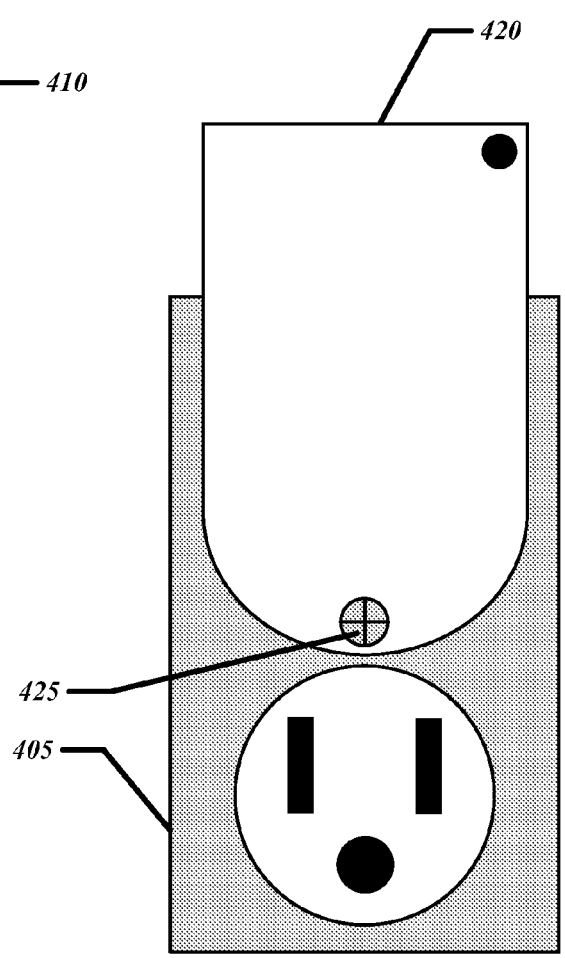

FIGS. 4a and 4b illustrate components involved in securing example virtual meters to an electrical outlet. In FIG. 4a the housing 400 of the virtual meter 105 includes a tab 410 that accepts a screw 415 to secure the virtual meter 105 to the faceplate 405 of the electrical outlet. The tab 410 may be located in other positions on the housing 400 to secure the virtual meter 105 to the faceplate 405. For example, the virtual meter 105 may be plugged into the lower outlet and the tab 410 may be located on the top of the housing 400. In FIG. 4b, another example housing 420 of the virtual meter 105 includes an opening to accept the screw 425 through the housing 420 itself to secure the virtual meter 105 to the faceplate 405 of the electrical outlet. In certain embodiments, the locking mechanism may include a bracket included on the faceplate 405 of the electrical outlet to secure the virtual meter 150 to the faceplate 405.

Figure 5A:
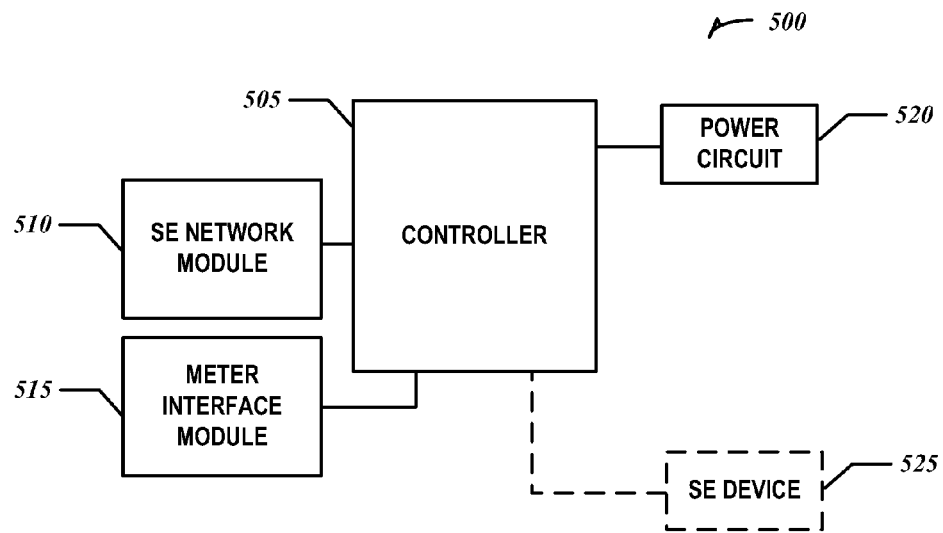
FIG. 5a illustrates a block diagram of components of an example virtual meter.

FIG. 5a illustrates a block diagram of components of an example virtual meter 105. The virtual meter 105 may include a controller 505, a power circuit 520, an SE network module 510, and a meter interface module 515. In some embodiments the virtual meter 105 may additionally include, but not shown, one or more of the following: a lighting element, a switch, a SE device, and a communication port.

The controller 505, SE network module 510, and meter interface module 515 may be implemented in hardware, software, firmware, or any combination of the three with other hardware supporting implementations in software or firmware. Example hardware may include a microcontroller, a logical state machine, and a processor such as a microprocessor, application specific integrated circuit ("ASIC"), or other type of processor.

Figure 5B:
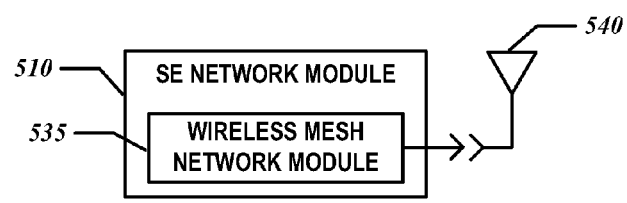
FIG. 5b illustrates a block diagram of components of an example SE network module.

The SE network module 215 may provide both the physical and logical connection from the virtual meter 105 to the SE network 120. FIG. 5b illustrates a block diagram of components of an example SE network module 510 in some embodiments, including a wireless mesh network module 535 coupled to an antenna 540. In some embodiments the antenna 540 may be internal to the virtual meter's 105 housing. An internal antenna may simplify deployment of the virtual meter 105 and improve reliability by protecting the antenna 540 within the housing. In other embodiments, the antenna 540 may be external to the virtual meter's 105 housing and coupled to the wireless mesh network module 535 via, for example, the external antenna connector 310 shown on FIG. 3. Using an external antenna may increase the RF range of the virtual meter 105.

Figure 5C:
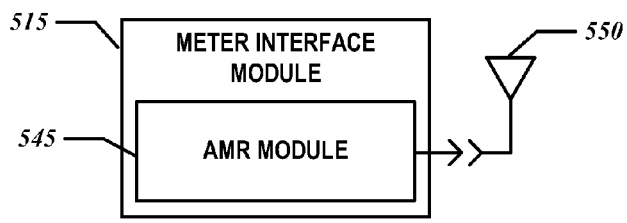
FIG. 5c illustrates a block diagram of components of an example meter interface module.

The meter interface module 515 may provide both the physical and logical connection from the virtual meter 105 to the utility meter 110. The utility meter 110 may implement a variety of connection mechanisms, Itron ERT being an example AMR connection mechanism. FIG. 5c illustrates a block diagram of components of an example meter interface module 515 in some embodiments. The meter interface module 515 may include an AMR network module 545 coupled to an antenna 550. Antenna 550 may be either internal or external to the virtual meter's 105 housing. In some embodiments a single antenna may be used for both the wireless mesh network module 250 and the AMR network module.

The controller 505, the SE network module 510, and the meter interface module 515 may permit the virtual meter 105 to present the utility meter 105 on the SE network 120 as a SE utility meter. For example, the SE network module 215 may receive communications directed to the utility meter 105, from components interfacing with the SE network 120 in the communications protocol in use by the SE network 120. The controller 205 may then translate, or transform, the communications from the SE network 120 format to a format acceptable to the utility meter 105. The controller 505 may then instruct the meter interface module 515 to communicate the translated communication to the utility meter 105. The same process, in reverse, may complete the communications loop, thus giving the SE network 120 access to the utility meter 105 using a SE standard of the SE network 120.

In some embodiments the controller 505 may receive instructions or configuration information from an external device. The controller 505 may also control joining the SE network 120 and interfacing with the utility meter 110. In some embodiments, the controller may give status indications, either physically visible to a person deploying the virtual meter 105 or logical readable by a computational device, to assist in the installation of the virtual meter 105. For example, the virtual meter 105 may include several display elements, or "Bars", which together indicate the strength of a wireless connection to the SE network 120, the utility meter 110, or both.

The power circuit 520 may be connected to the previously discussed integrated plug 305. In some embodiments the power circuit 520 may be a universal power supply circuit capable of operating at a variety of outlet voltages and currents. In some embodiments the power circuit 520, upon receiving power, may prompt the controller 505 to initiate joining the SE network 120 or interfacing with the utility meter 110. In other embodiments a switch on the virtual meter 105, or an external device directly connected to the virtual meter 105, may prompt the controller 505 to join the SE network 120 or interface with the utility meter 110.

In some embodiments the virtual meter 105 may optionally include a SE device 525. The SE device 525 may be a monitoring or control device on the SE network 120 and comply with the standards of the SE network 120. For example, the SE device 525 may be a SE thermostat conforming to a Smart Energy standard for thermostats. Other examples may include another utility meter, a motion sensor, and a smoke sensor, among others.

It should be appreciated that the individual blocks within the block diagram do not necessarily correspond to discrete hardware structures. For example, some functionality of the SE network module 510 or the meter interface module 515 may be included in the controller 205.

Figure 6:
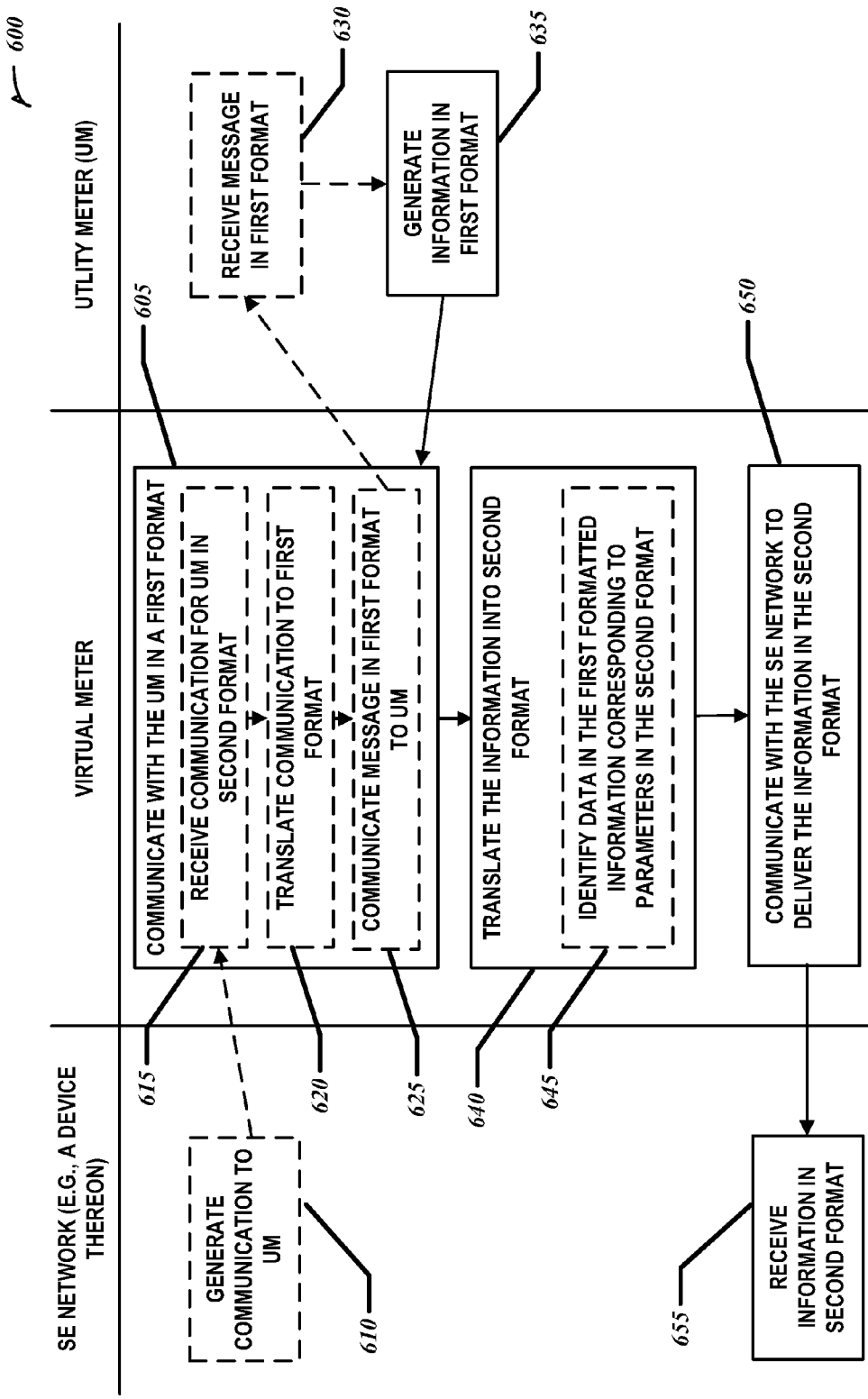
FIG. 6 illustrates a swim-lane flow chart of an example method using a virtual meter.

FIG. 6 illustrates a swim-lane flow chart of an example method 600 using a virtual meter.

At 605 the virtual meter 105 may communicate with the utility meter 110 in a first format using a first communications protocol. For example, the first format and first communications protocol may be imposed by an AMR in use by the utility meter 110, such as Itron ERT.

An optional origination of the communication in 605 may start at 610 where the SE network 120 (e.g., some device on the SE network 120 or interfaced with the SE network 120) may generate a communication to the utility meter 110. In some embodiments the communication is directed at the SE utility meter that the virtual meter 105 presents to the SE network 120. In some embodiments the communication may be a request for a reading of the utility meter 105 or a command to the utility meter 105.

At 615 the virtual meter 105 receives the communication in a second format. In some embodiments the second format is imposed by a standard for the SE network such as ZigBee Alliance's Smart Energy standard for gas meters. The communication may also be received in a second communications protocol in use by the SE network 120.

At 620 the virtual meter 105 may translate the communication to the first format it uses to communicate with the utility meter 105.

At 625 the virtual meter 105 may then communicate the message resulting from the translating at 620 to the utility meter 105 using the first communications protocol.

At 630 the utility meter 105 may receive the message and act on it. For example, it may reset itself if the message so indicates and the utility meter 105 supports such a command.

At 635 the utility meter 105 may generate information in the first format, which may be the information received by the virtual meter 105 at 605. The generated information may be called "meter information" comprising the data, or a portion thereof, available to an AMR reader connecting to the utility meter 105. For instance, if the utility meter 105 is a gas meter, the meter information may constitute the cubic feet of gas consumed. Other data may be included in the meter information, such as the date, or diagnostic information concerning the utility meter 105.

At 640, following 605, the virtual meter may translate the meter information in the first format into "virtual meter information" in the second format. Virtual meter information is simply meter information transformed to conform to a SE utility meter standard implemented by the virtual meter 105.

At 645, in some embodiments, the translating of 640 may include identifying data in the meter information that corresponds to parameters in the virtual information. For example, if the first format is a positional format—i.e., that a piece of data is identified by a first number of bytes offset by a second number of bytes from the beginning of the meter information—the virtual meter 105 may include a mapping of the data positions in the meter information, and extract the individual data elements that correspond to elements in the virtual meter information. The data positions or data elements may be called parameters of the respective information formats. The same translation process may be followed if the first format is field formatted—i.e., each data element is within a labeled field only more easily because the mapping need only match a field from the first format with a given data element in the second format. These could include such things as the amount of resource consumed, the date, diagnostic information, or other data supported by the second format and available in the first format. In some embodiments, the virtual meter 105 may perform a calculation, combine data elements, or otherwise massage data flowing in either direction when translating between the first and second formats.

At 650 the virtual meter 105 has translated the meter information in the first format into virtual meter information in the second format and communicates the virtual meter information to the SE network 120 using the second communications protocol.

At 655 the SE network 120, or rather the recipient device on the SE network 120, receives the virtual meter information. Thus, the SE network 120 may utilize the utility meter 110 as a SE utility meter through the bridge interface provided by the virtual meter 105. Accessing the utility monitor 110 in this way may allow for nearly real-time meter readings without the expense and manpower needed to service legacy AMR networks. These more frequent readings may allow for more accurate billing or better resource management across a utility's service network, which may reduce costs and increase efficiency.

Providing an interface between legacy utility meters and smart energy networks may reduce costs to utility companies, and add capabilities to the smart energy network. The cost reductions may be realized by utilizing existing, functioning, meters in advanced applications, such as smart energy networks, without the need for expensive upgrades or replacements. Also, the utility companies may then integrate these legacy utility meters into AMIs as they move away from legacy AMR systems.

Additionally, integrating a plug into the virtual meter may ease its deployment in a smart energy network by providing a compact and robust package with sufficient power at any one of many conveniently located electrical outlets. The convenience of placing the smart energy gateway at an electrical outlet is increased when factors such as access to the legacy utility meter are considered.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A virtual meter comprising a controller configured to:
communicate, with a utility meter, meter information using a first communications protocol;
translate between meter information and virtual meter information; and
communicate, with a smart energy (SE) network, the virtual meter information using a second communications protocol in order to present the utility meter as a SE utility meter to the SE network, wherein the first communications protocol is an automatic meter reading (AMR) protocol incompatible with the SE network.

2. The virtual meter of claim 1, wherein the virtual meter information conforms to a ZigBee Smart Energy meter profile; and wherein the meter information does not conform to the ZigBee Smart Energy meter profile.

3. The virtual meter of claim 2, wherein the Smart Energy meter profile conforms to a ZigBee Smart Energy 1.1 standard.

4. The virtual meter of claim 1, wherein the second communications protocol is a wireless mesh network protocol.

5. The virtual meter of claim 4, wherein the wireless mesh network is a ZigBee protocol network.

6. The virtual meter of claim 4, wherein the wireless mesh network implements an IEEE 802.15.4 communication protocol standard for wireless personal area networks (WPANs).

7. The virtual meter of claim 1, wherein the AMR protocol is wireless.

8. The virtual meter of claim 7, wherein the AMR protocol is Itron Encoder-Receiver-Transmitter (ERT).

9. The virtual meter of claim 1, where the virtual meter includes at least one of a SE router, SE gateway, or SE device.

10. A virtual meter comprising:
a housing;
a power plug integrated into the housing, wherein the virtual meter can be mounted to an electrical outlet via the power plug and wherein the virtual meter receives power through the power plug; and
a controller configured to:
communicate, with a utility meter, meter information using a first communications protocol;
translate between the meter information and virtual meter information; and
communicate, with a smart energy (SE) network, the virtual meter information using a second communications protocol in order to present the utility meter as a SE utility meter to the SE network, wherein the first communications protocol is an automatic meter reading (AMR) protocol incompatible with the SE network.

11. The virtual meter of claim 10, wherein the virtual meter includes a locking mechanism to secure the virtual meter to the electrical outlet.

12. The virtual meter of claim 10, wherein the virtual meter information conforms to a ZigBee Smart Energy meter profile; and wherein the meter information does not conform to the ZigBee Smart Energy meter profile.

13. The virtual meter of claim 12, wherein the Smart Energy meter profile conforms to a ZigBee Smart Energy 1.1 standard.

14. The virtual meter of claim 10, wherein the second communications protocol is a wireless mesh network protocol.

15. The virtual meter of claim 14, wherein the wireless mesh network is a ZigBee protocol network.

16. The virtual meter of claim 14, wherein the wireless mesh network implements an IEEE 802.15.4 communication protocol standard for wireless personal area networks (WPANs).

17. The virtual meter of claim 10, wherein the AMR protocol is wireless.

18. The virtual meter of claim 17, wherein the AMR protocol is Itron Encoder-Receiver -Transmitter (ERT).

19. The virtual meter of claim 10, where the virtual meter includes at least one of a SE router, SE gateway, or SE device.

20. The virtual meter of claim 10, wherein the power plug is interchangeable.

21. A system comprising:
a smart energy (SE) network, the smart energy network implementing a first communications protocol;
a utility meter, the utility meter implementing a second communications protocol, the second communications protocol being an automatic meter reading (AMR) protocol incompatible with the SE network; and
a virtual meter communicatively coupled to the SE network and the utility meter, wherein the virtual meter includes a power plug and a controller configured to:
communicate, with the utility meter, meter information using the first communications protocol;
translate between the meter information and virtual meter information; and
communicate, with the SE network, the virtual meter information using the second communications protocol in order to present the utility meter as a SE utility meter to the SE network; and
wherein the power plug is integrated into a housing of the virtual meter and the virtual meter can be mounted to an electrical outlet via the power plug.

22. The system of claim 21, wherein the virtual meter includes a locking mechanism to secure the virtual meter to the electrical outlet.

23. The system of claim 21, wherein the virtual meter information conforms to a ZigBee Smart Energy meter profile; and wherein the meter information does not conform to the ZigBee Smart Energy meter profile.

24. The system of claim 23, wherein the Smart Energy meter profile conforms to a ZigBee Smart Energy 1.1 standard.

25. The system of claim 21, wherein the first communications protocol is a wireless mesh network protocol.

26. The system of claim 25, wherein the wireless mesh network is a ZigBee protocol network.

27. The system of claim 25, wherein the wireless mesh network implements an IEEE 802.15.4 communication protocol standard for wireless personal area networks (WPANs).

28. The system of claim 21, wherein the AMR protocol is wireless.

29. The system of claim 28, wherein the AMR protocol is Itron Encoder-Receiver-Transmitter (ERT).

30. The system of claim 21, where the virtual meter includes at least one of a SE router, SE gateway, or SE device.

31. In a system having a smart energy (SE) network, a utility meter, and a virtual meter, a method comprising:
communicating, using the virtual meter, in a first format with the utility meter using a first communications protocol;
translating, using the virtual meter, the first format to a second format to create a message, wherein the first and second formats are different; and
communicating, using the virtual meter, the message to the SE network using a second communications protocol in order to present the utility meter as a SE utility meter to the SE network, wherein the first and second communications protocols are different, and wherein the first communications protocol is an automatic meter reading (AMR) protocol incompatible with the SE network.

32. The method of claim 31, wherein communicating in a first format with the utility meter includes:
receiving, from the SE network, a communication for the utility meter in the second format;
translating the communication from the second format to the first format to create a second message; and
communicating the second message to the utility meter.

33. The method of claim 31, wherein translating includes identifying data in the first format that corresponds to parameters of the second format.

34. The method of claim 31, wherein the second format conforms to a ZigBee Smart Energy meter profile; and wherein the meter information does not conform to the ZigBee Smart Energy meter profile.

35. The method of claim 31, wherein the first format conforms to an Itron Encoder-Receiver-Transmitter (ERT) format.

* * * * *